(12) United States Patent
Von Stein et al.

(10) Patent No.: US 9,018,609 B2
(45) Date of Patent: Apr. 28, 2015

(54) DEVICE AND SYSTEM FOR READING OUT X-RAY INFORMATION STORED IN STORAGE PHOSPHOR PLATES AND STORAGE PHOSPHOR PLATE

(75) Inventors: Florian Von Stein, Grafrath (DE); Heinz Backhaus, Schrobenhausen (DE)

(73) Assignee: Agfa Healthcare NV, Mortsel (BE)

( * ) Notice: Subject to any disclaimer, the term of this patent is extended or adjusted under 35 U.S.C. 154(b) by 0 days.

(21) Appl. No.: 14/342,841

(22) PCT Filed: Aug. 13, 2012

(86) PCT No.: PCT/EP2012/003450
§ 371 (c)(1),
(2), (4) Date: Mar. 5, 2014

(87) PCT Pub. No.: WO2013/034239
PCT Pub. Date: Mar. 14, 2013

(65) Prior Publication Data
US 2014/0284505 A1    Sep. 25, 2014

(30) Foreign Application Priority Data
Sep. 6, 2011   (EP) .................................. 11007232

(51) Int. Cl.
| G01T 1/105 | (2006.01) |
| G01T 1/20 | (2006.01) |
| G03B 42/04 | (2006.01) |
| G03B 42/08 | (2006.01) |

(52) U.S. Cl.
CPC .............. *G01T 1/2014* (2013.01); *G03B 42/04* (2013.01); *G03B 42/08* (2013.01); *G01T 1/2012* (2013.01)

(58) Field of Classification Search
CPC ..... G03B 42/08; G01T 1/2012; G01T 1/2014
USPC .................................................... 250/580–591
See application file for complete search history.

(56) References Cited

U.S. PATENT DOCUMENTS 5,210,416 A    5/1993  Seto et al.
5,475,406 A *  12/1995 Takahashi ..................... 347/154

FOREIGN PATENT DOCUMENTS

DE    26 21 120 C2    12/1976
DE    40 21 660 C1     6/1991
(Continued)

OTHER PUBLICATIONS

English translation of Official Communication issued in corresponding International Application PCT/EP2012/003450, mailed on Mar. 20, 2014.
(Continued)

*Primary Examiner* — Kiho Kim
(74) *Attorney, Agent, or Firm* — Keating & Bennett, LLP

(57) ABSTRACT

A device and a corresponding system for reading X-ray information stored in a storage phosphor plate includes a reading device for irradiating the storage phosphor plate with stimulation light and for detecting emission light stimulated in the storage phosphor plate, and a conveyance device for conveying the storage phosphor plate including at least one roller that can be put into rotation about its rotational axis. In order to guarantee, with a simple structure, the most reliable possible transport of the storage phosphor plate, one or more magnets, more particularly permanent magnets, are arranged in the interior of the cylinder which is formed as a hollow body, more particularly a hollow cylinder.

20 Claims, 3 Drawing Sheets

(56) References Cited

FOREIGN PATENT DOCUMENTS

| | | |
|---|---|---|
| EP | 0 347 647 A1 | 12/1989 |
| EP | 0 866 361 A2 | 9/1998 |
| EP | 1 895 364 A1 | 3/2008 |
| FI | 911 433 A | 9/1992 |
| JP | 2010-49057 A | 3/2010 |

OTHER PUBLICATIONS

Official Communication issued in International Patent Application No. PCT/EP2012/003450, mailed on Jan. 3, 2013.

\* cited by examiner

DEVICE AND SYSTEM FOR READING OUT X-RAY INFORMATION STORED IN STORAGE PHOSPHOR PLATES AND STORAGE PHOSPHOR PLATE

CROSS-REFERENCE TO RELATED APPLICATIONS

This application is a 371 National Stage Application of PCT/EP2012/003450, filed Aug. 13, 2012. This application claims the benefit of European Application No. 11007232.9, filed Sep. 6, 2011, which is incorporated by reference herein in its entirety.

BACKGROUND OF THE INVENTION

1. Field of the Invention

The present invention relates to a device and a system for reading out X-ray information stored in storage phosphor plates as well as a storage phosphor plate.

2. Description of the Related Art

The storing of X-rays penetrating an object, for example a patient, as a latent image in a so-called storage phosphor plate constitutes an option for recording X-ray images. In order to read out the latent image, the storage phosphor plate is irradiated with stimulating light and thereby stimulated to emit emission light. The emission light, the intensity of which corresponds to the image stored in the storage phosphor plate, is detected by an optical detector and converted into electrical signals. The electrical signals are further processed, as required, and finally made available for analysis, in particular for medical-diagnostic purposes, by providing them on a corresponding output device, such as for example a monitor and/or a printer.

In prior art devices and systems, storage phosphor plates are mostly transported relative to the read-out device by pairs of rotating rollers.

SUMMARY OF THE INVENTION

The problem addressed by preferred embodiments of the present invention is to provide a device and a system for reading out X-ray information stored in storage phosphor plates as well as a corresponding storage phosphor plate, the device and system assuring a transport of the storage phosphor plate that is as reliable as possible, while providing a straightforward structure.

Preferred embodiments of the present invention provide a device, a system and the storage phosphor plate as described below.

The device according to a preferred embodiment of the present invention comprises a read-out device for irradiating the storage phosphor plate with stimulating light and for detecting emission light which is thereby stimulated in the storage phosphor plate as well as a transport device for transporting the storage phosphor plate comprising at least one roller that can be put into rotation about its rotational axis, and is characterized in that one or more magnets are arranged inside the roller which has the form of a hollow body, in particular a hollow cylinder.

Apart from the device according to a preferred embodiment of the present invention, the system according to a preferred embodiment of the present invention comprises a storage phosphor plate comprising a base layer and a storage phosphor layer located on the base layer, at least one partial area of the base layer of the storage phosphor plate being ferromagnetic.

The storage phosphor plate according to a preferred embodiment of the present invention comprises a base layer and a storage phosphor layer located on the base layer and is characterized in that the base layer of the storage phosphor plate comprises a ferromagnetic layer and two non-ferromagnetic layers, in particular two plastic layers, the ferromagnetic layer being arranged between both non-ferromagnetic layers.

Preferred embodiments of the present invention are based on the thought of providing a hollow roller for transporting the storage phosphor plate, whereby one or more magnets are arranged inside the hollow roller in such a way that during a rotation of the roller they maintain a predetermined spatial position and in particular do not follow the rotational movement of the roller. The hollow roller body itself is hereby not magnetic, in particular not ferromagnetic. A storage phosphor plate which is made magnetic and/or ferromagnetic at least in partial areas is attracted towards the hollow roller body by magnetic forces by the magnets arranged inside the hollow roller body in such a way that the frictional forces which occur when the storage phosphor plate comes into contact with the hollow roller body are considerably increased compared to a roller with no additional magnets arranged in its inside. During a rotation of the roller the transport of the storage phosphor plate contacting the roller is assured with a reliability which is correspondingly increased. Compared to a transport device in which the storage phosphor plate is clamped between two rotating rollers in order to be transported in a reliable way by these rollers, a second roller may be omitted in the present case.

Overall, preferred embodiments of the present invention provide the advantage of combining a straightforward structure and a reliable plate transport.

In a preferred embodiment of the present invention, inside the roller a support is provided which extends in the direction of the rotational axis of the roller and at which the magnets are arranged. This configuration allows for an easy and reliable mounting of the magnets inside the roller.

Preferably, the support is rotatably mounted about a longitudinal axis which runs substantially parallel to the rotational axis of the roller or coincides with the rotational axis of the roller. This has the effect that the support and the magnets, respectively, can be rotated independently from the hollow roller body.

Preferably, the rotational position of the support hereby allows to select an area at the outside circumference of the roller in which a magnetic field occurs which is larger than the remaining outside circumference of the roller so that a ferromagnetic body, in particular a storage phosphor plate, is attracted by the roller when contacting the area on the outside circumference of the roller. The respective rotational position of the support thus allows selecting the area on the outside circumference of the roller at which the frictional forces are at their greatest during a contact between the storage phosphor plate and the roller. The selection of the rotational position of the support or the magnets, respectively, allows adjusting in a simple and precise manner when the storage phosphor plate is transported when contacting the rotating roller (the magnets are as closely as possible to the contact position) or not (the magnets are as remote as possible from the contact position).

Moreover, it is preferred that the support has the form of a bar, in particular with a rectangular or square cross-section. This allows implementing the above-described functionalities of the support in a simple and reliable way.

Preferably, the support or at least a section of the support is made ferromagnetic. For example, the support or a section of the support is composed of iron or a ferromagnetic iron alloy. As the magnetic attraction forces between the magnets and the support hereby already ensure the fixation of the magnets to the support, no further fixing devices, e.g. adhesive, clamps, screws or rivets, are needed. However, additional fixing devices can be provided in order to assure a secure fixation.

Preferably, the magnets are arranged in a lateral area of the support which in particular extends parallel to the rotational axis of the roller. This allows realizing the arrangement of the magnets inside the hollow roller body as well as the selection of the respective position of the magnets in a particularly simple and reliable manner.

The magnets arranged inside the roller can have the form, for example, of electromagnets. Electromagnets hereby have the advantage that their magnetic fields can be switched on and off, respectively, as and when required. Preferably, however, the magnets used are permanent magnets so that additional provisions, such as, for example, the power cables required in case of electromagnets, can be omitted, which simplifies the construction further.

In a preferred embodiment, the roller having the form of a hollow body is composed of a non-ferromagnetic material, in particular aluminum. A non-ferromagnetic material in the context of the present invention hereby is a diamagnetic or paramagnetic material having a relative magnetic permeability close to the value 1, in particular between about 0.99 and 1.01, that is able to weaken or amplify, respectively, a magnetic field only slightly. This assures high magnetic flow densities in the area of the roller jacket and hence high frictional forces in the contact area between the storage phosphor plate and the roller, thus assuring a reliable transport.

A further advantageous development provides that the outer circumferential area of the roller is provided with a friction-enhancing coating, in particular made of rubber or plastic. This allows a further amplification of the frictional forces between the storage phosphor plate and the roller that are already increased by the magnetic attraction forces, which in turn further enhances the reliability of the transport of the storage phosphor plate.

In a further preferred embodiment of the present invention, the transport device comprises a removal unit which can be coupled to the storage phosphor plate and which is ferromagnetic in at least a partial area so that the removal unit, optionally together with the storage phosphor plate coupled thereto, can be transported by the rotating roller when contacting it. Preferably, the removal unit is designed for removing and/or returning the storage phosphor plate located in an initial position, in particular in a cassette, respectively from and into the initial position. The removal unit that is ferromagnetic at least in partial areas and the roller are arranged in such a way that they are able to come into contact with each other and the removal unit can be transported by the rotating roller. Hence, the roller can indirectly—i.e. through the removal unit—also remove and/or return the storage phosphor plate respectively from and into the initial position, in particular a cassette, without requiring a further drive for the removal unit.

Alternatively or additionally, the transport device is designed for transporting the storage phosphor plate relative to the read-out-device, in particular past the read-out device. Preferably, the roller is hereby arranged close to, in particular below, the read-out device so that, wherever possible, the complete storage phosphor plate can pass through the read-out device and be read out by it. This allows omitting additional drive or transport devices for transporting the plate past the read-out device. A positioning of the roller below the read-out device, in particular below a line described by the deflected stimulating light beam, has the additional advantage that the storage phosphor plate supported by the roller shows a high degree of evenness, which allows a particularly reliable read-out of the X-ray information stored in the storage phosphor plate.

In a preferred embodiment of the storage phosphor plate, the ferromagnetic layer, in particular in its edge portion, is provided with at least one additional ferromagnetic area. As a result, the magnetic attraction forces occurring during a magnetic coupling between the transport device, in particular the removal unit, and the storage phosphor plate in the proximity of the ferromagnetic area, in particular in the edge portion of the ferromagnetic layer, are particularly strong. This makes the removal, the transport and the return, respectively, of the storage phosphor plate particularly reliable.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
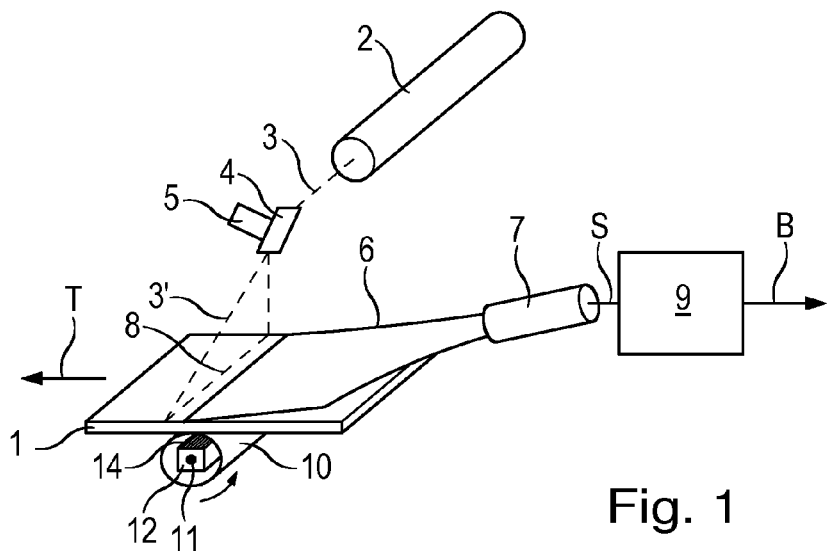
FIG. 1 a schematic representation of a device for reading out storage phosphor plates.

FIG. 1 shows a read-out device for reading out a storage phosphor plate 1. A laser 2 generates a stimulating light beam 3 that is deflected by a deflection element 4 in such a way that the stimulating light beam moves along a line 8 across the storage phosphor plate 1 to be read out. The deflection element 4 has a reflecting area, in particular in the form of a mirror, that is made to move oscillatingly by a drive device 5. Alternatively, the deflection element 4 can have a polygon mirror that is made to move rotationally by the drive device 5, in this case a motor, and deflects the stimulating light beam 3 across the storage phosphor plate 1.

During the movement of the deflected stimulating light beam 3' across the storage phosphor plate 1, the storage phosphor plate emits emission light depending on the X-ray information stored therein, which emission light is collected by an optical collection device 6, for example an optical fiber bundle or a suitable mirror device, and detected by an optical detector 7, preferably a photomultiplier (PMT), and is thereby converted into a corresponding detector signal S.

The detector signal S is supplied to a device 9, in which digital image signal values B for individual pixels of the read out X-ray image are derived.

The transport of the storage phosphor plate 1 in the transport direction T by a transport device has the effect that individual lines 8 of the storage phosphor plate 1 are successively read out, and a two-dimensional composite X-ray image is thereby obtained that is composed of individual pixels with respectively one associated image signal value B.

In the example shown, the transport device comprises a roller 10 that is put into rotation about a rotational axis 11 by a roller drive (not shown). The storage phosphor plate 1 is supported, with its underside, by the roller 10 and is transported in direction T by the rotation of the roller 10 as a result of the frictional engagement occurring hereby.

In the example shown, the frictional forces that hereby occur between the storage phosphor plate 1 and the roller 10 are substantially increased by the fact that the storage phosphor plate 1 which is permanently magnetic or ferromagnetic at least in partial areas, is attracted towards roller 10 by magnetic forces. The magnetic fields required hereby are generated by one or more permanent magnets 14 which are arranged on a support 12 which extends inside the roller 10. The roller 10 and the support 12 are hereby mounted or arranged in such a way that the rotational position of the support 12 remains unchanged when roller 10 rotates about its rotational axis 11 in the rotation direction indicated by an arrow. As a result, the magnetic field generated by the permanent magnet(s) 14 is at its largest in the upper part of the roller 10 which supports the storage phosphor plate 1. In this part, the frictional forces between the storage phosphor plate 1 and the roller 10 are significantly increased, which allows a reliable transport of the storage phosphor plate in transport direction T.

Figure 2:
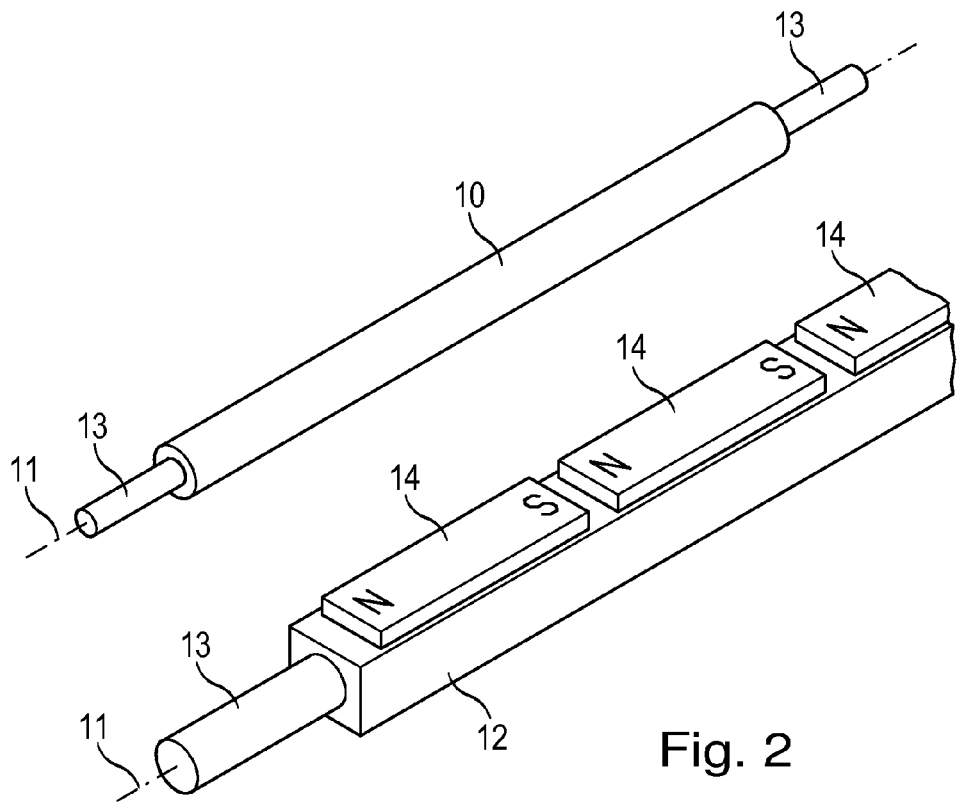
FIG. 2 a perspective representation of an example of a roller with a support provided on its inside and an enlarged cut-out view from the support.

FIG. 2 shows an example of a roller 10 with a support provided inside the roller 10, whereby FIG. 2 only shows the bearing portions 13 of the support (upper part of the Figure), as well as an enlarged cut-out view from the support 12 (lower part of the Figure), in each case in a perspective representation.

Roller 10 preferably is a hollow body, for example a tube, made from a non-ferromagnetic material, for example aluminum or plastic. Preferably, the outer circumference of the roller 10 is configured in such a way that the frictional forces occurring when the storage phosphor plate 1 comes into contact with the roller 10 are as strong as possible. This is achieved, for example, by using a rubber coating or a plastic coating. The roller 10 is rotatably mounted in the device by bearings (not shown) and is put into rotation by a suitable roller drive.

Both ends of the support 12 which is provided inside the roller 10 are provided with a bearing section 13 which ensures the mounting of the support 12 in the device. Preferably, the support 12 is hereby rotatably mounted about its longitudinal axis, whereby the selection of the respective rotational position of the support 12 allows defining in which circumferential area of the roller 10 the magnetic attraction forces are at their largest. Preferably, the rotational axis of the support 12 and the rotational axis 11 of the roller 10 run coaxially, i.e. both axes coincide. Alternatively, it can be provided that the rotational axis of the support 12 runs parallel to the rotational axis 11 of the roller 10.

In the example shown, the support 12 comprises a bar-like section with a square cross-section, whereby several permanent magnets 14 are arranged along a side of the bar-like section. Preferably, the bar-like section of the support 12 is ferromagnetic so that magnetic attraction forces already assure a reliable adhesion of the permanent magnets 14 to the support 12. Additionally or—in case the bar-like section of the support 12 is not ferromagnetic—alternatively, the permanent magnets 14 can also be fixed to the support 12 by a suitable adhesive or other fixing device.

Figure 3:
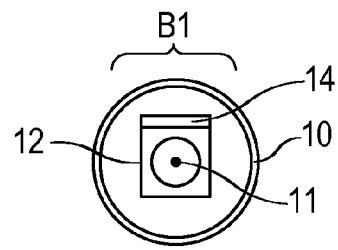
FIG. 3 a cross-sectional view through a roller with a support provided on its inside at two different rotational positions of the support.

FIG. 3 shows a cross-section through a roller 10 with a support 12 located on its inside at two different rotational positions of the support 12.

In the rotational position of the support 12 as shown in the upper part of the Figure, the magnetic field generated by the magnets 14 is at its largest in an upper circumferential part B1 which runs parallel to the rotational axis 11 of the roller 10. A storage phosphor plate supported by area B1 (see FIG. 1) and having ferromagnetic properties is then attracted towards roller 10 by high magnetic forces—additionally to gravity.

On the other hand, in the case of the rotational position of the support 12 as shown in the lower part of the Figure, the magnetic field is at its largest in a circumferential area B2 along the roller 10 which is displaced by about 45°. Accordingly, for this rotational position, the magnetic field is substantially smaller in the upper circumferential part compared to the rotational position as shown in the upper part of the Figure. As a result, in the case of this rotational position, the magnetic attraction forces and thus the frictional forces between a storage phosphor plate 1 supported by area B1 and the roller 10 are correspondingly smaller.

This means that the selection of the rotational position of the support 12 and the magnets 14 located thereon allows adjusting precisely when, for example, a storage phosphor plate 1 supported by the upper circumferential area B1 of the roller 10 will be transported during a rotation of the roller 10 (upper part of the Figure) or has to be released by the roller 10 (lower part of the Figure), for example during a return of the storage phosphor plate 1 in a cassette provided.

Figure 4:
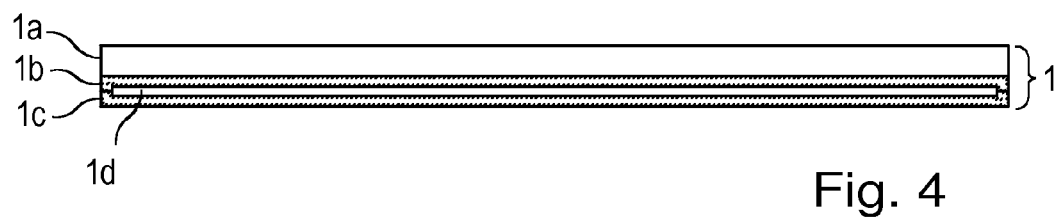
FIG. 4 a cross-sectional view of a first example of a storage phosphor plate.

FIG. 4 shows a cross-section of a first example of a storage phosphor plate 1 comprising a storage phosphor layer 1a that has been applied to a base layer. In the example shown, the base layer comprises a ferromagnetic layer 1d that is surrounded by two non-ferromagnetic layers 1b and 1c.

The ferromagnetic layer 1d preferably is a steel sheet having a thickness between approximately 0.01 mm and 0.1 mm, preferably of approximately 0.05 mm. Both non-ferromagnetic layers 1b and 1c preferably are plastic sheets. Preference is hereby given to polyester foils that allow achieving a particularly good frictional engagement between the underside of the storage phosphor plate 1 and the roller 10. This particularly applies if the outer circumference of the roller 10 is provided with a rubber coating.

A particularly reliable frictional engagement is hereby achieved in particular if the rubber coating of the roller 10 is made of nitrile butadiene rubber (NBR). Preferably, the outer surface of the roller 10 is hereby provided, for example by coating or bandaging, with a rubber layer or a layer of raw rubber which is subsequently vulcanized at temperatures of preferably more than 120° C. The roller 10 thus coated is post-treated by bringing to the desired size and/or flattening the rubber surface, preferably by grinding. This allows achieving a high degree of evenness so that the storage phosphor plate 1 running on the rubber-coated roller 10 can be transported virtually without shocks and/or vibrations.

As can be seen from the Figure, the surface area of the ferromagnetic layer 1d is smaller than the surface area of both non-ferromagnetic layers 1b and 1c. As a result, the ferromagnetic layer 1d is also surrounded by the non-ferromagnetic layers 1b and 1c in the edge portion and is therefore protected against both mechanical and climatic influences, for example against corrosion.

The layers 1b, 1c and 1d are preferably attached to each other by laminating. Preference is hereby given to a so-called hot-melt adhesive that is solid at room temperature fest and only becomes adhesive when heated.

In the described preferred embodiment, it is possible to make the ferromagnetic layer 1d very thin in the manner already described hereinbefore, without compromising too much on the mechanical stability of the base layer. At the same time, the described structure of the base layer allows an extremely light configuration of it. As a result, any fall will subject this configuration, thanks to its substantially lower weight, to considerably less strain than conventional storage phosphor plates. The risk of damages to the base layer itself and/or to the storage phosphor layer 1a located thereon is substantially reduced that way.

Figure 5:
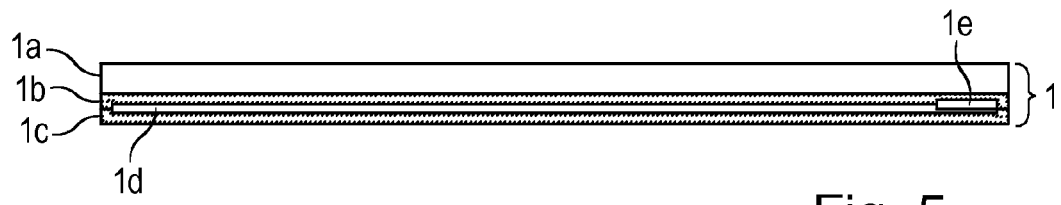
FIG. 5 a cross-sectional view of a second example of a storage phosphor plate.

FIG. 5 shows a cross-section of a second example of a storage phosphor plate 1. Additionally to the layers already illustrated by FIG. 4, the preferred embodiment represented here shows an additional ferromagnetic area 1e has been provided in the edge portion of the ferromagnetic layer 1d.

The additional ferromagnetic area 1e has, for example, the form of a strip that runs along an edge portion of the ferromagnetic layer 1b (in this case perpendicular to the figure plane). Similarly to ferromagnetic layer 1d, area 1e preferably is a thin steel sheet having a typical thickness between about 0.01 mm and 0.1 mm.

Thanks to the additional ferromagnetic area 1e, the magnetic attraction forces generated by an external magnetic field are significantly increased in this area of the storage phosphor plate 1 compared to the remaining areas of the storage phosphor plate 1. This is particularly very advantageous if, during a so-called handling, the storage phosphor plate 1 has to be removed from an initial position, preferably from a cassette, and/or has to be returned in the initial position. Thanks to the additional magnetic area 1e in the edge portion of the storage phosphor plate 1, it is hereby achieved that a magnet which acts from the outside in this area can be coupled to the storage phosphor plate 1 with a particularly high attraction force and can subsequently guide the plate in a correspondingly reliable way. This is exemplified in greater detail by FIGS. 6 and 7.

Figure 6:
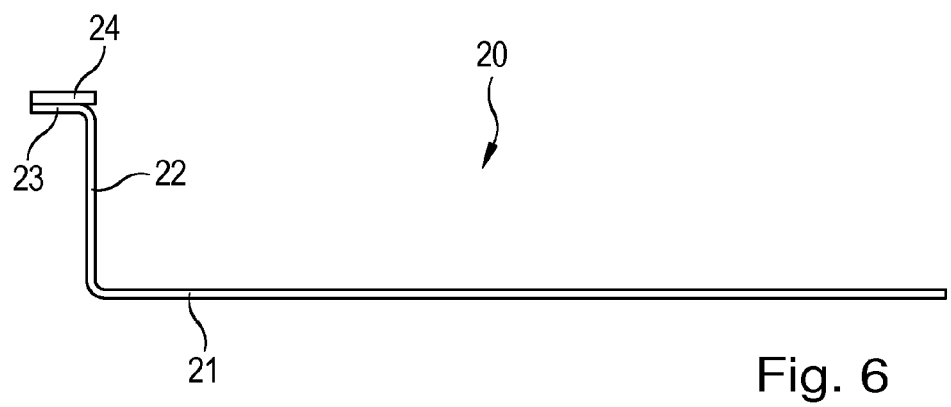
FIG. 6 a cross-sectional view of a removal unit.

FIG. 6 shows the cross-section of a removal unit 20 comprising a substantially even ferromagnetic base plate 21, a lateral area 22 which runs substantially perpendicular to the base plate 21 as well as a magnet 24 provided at a protrusion 23 of the lateral area 22, preferably a permanent magnet.

FIGS. 7a to 7d each show both a perspective representation (left part of the Figures) and a cross-sectional representation (right part of the Figures) of the removal unit 20 shown in FIG. 6 during the multi-phase removal of a storage phosphor plate 1 from a cassette 30.

Figure 7A:
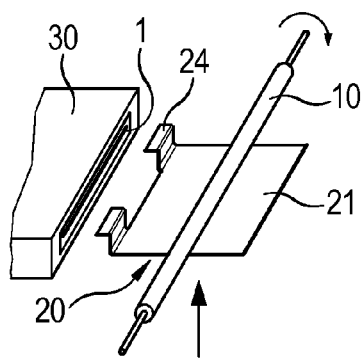
FIGS. 7a to 7d are perspective representations (left part) and a cross-sectional representation (right part) of a transport device in different phases during the removal of a storage phosphor plate from a cassette.
Figure 7A:
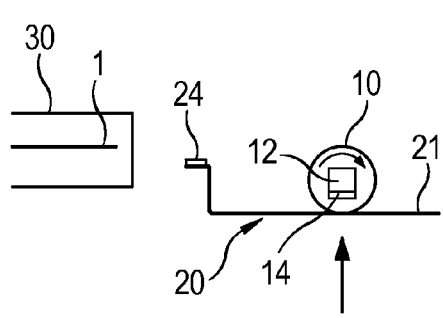

In the phase represented in FIG. 7a, the storage phosphor plate 1 is located inside the cassette 30. Roller 10 and removal unit 20 are arranged in such a way that a lower area of the roller 10 can come into contact with the ferromagnetic base plate 21 of the removal unit 20. The rotational position of the support 12 located inside the roller 10 and comprising the magnet 14 located thereon is hereby selected in such a way that the magnetic field generated by the magnets 14 is at its largest in the lower circumferential area of the roller 10, i.e. in the contact area between roller 10 and base plate 21 of the removal unit 20.

A corresponding drive roller puts the roller 10 into rotation in the direction of the curved arrows so that the removal unit 20 is transported by the roller 10 in the direction of the cassette 30.

Preferably, the base plate 21 of the removal unit 20 is mounted with a certain tolerance in vertical direction so that the base plate 21 can move away downwards from roller 10 when the magnets 14 located on the support 12 point upwards and the base plate 21 can be attracted by the roller 10 (see right part of FIG. 7a) when the magnets 14 located on the support 12 point downwards.

Figure 7B:
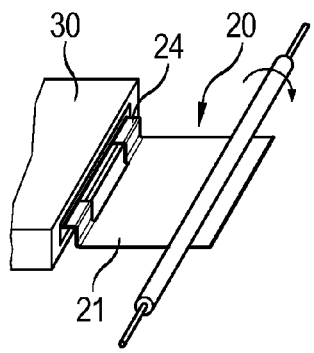
Figure 7B:
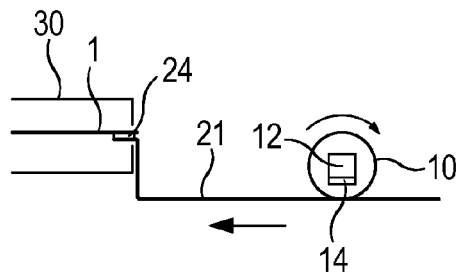

In the phase shown in FIG. 7b, the magnet 24 provided at the protrusion 23 of the lateral area 22 (see FIG. 6) of the base plate 21 of the removal unit 20 has reached a lateral side of the storage phosphor plate 1 and is coupled to it by magnetic attraction forces. The storage phosphor plate 1 is hereby preferably configured in the manner as shown in connection with FIGS. 4 and 5. In particular, the ferromagnetic layer 1d (see FIG. 5) comprises an additional magnetic area 1e in the edge portion in which the magnet 24 is coupled magnetically to the storage phosphor plate 1.

After the magnetic coupling of the removal unit 20 to the storage phosphor plate 1, the rotational direction of the roller 10 is reversed without changing the rotational position of the support 12 and the magnets 14 located thereon with respect to the phases shown in FIGS. 7a and 7b. This has the effect that the removal unit 20, together with the storage phosphor plate 1 coupled thereto, is transported in the opposite direction so that the storage phosphor plate 1 is transported out of the cassette 30.

Figure 7C:
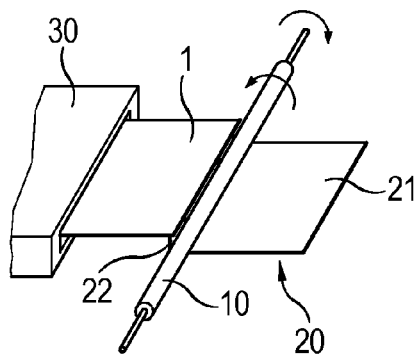
Figure 7C:
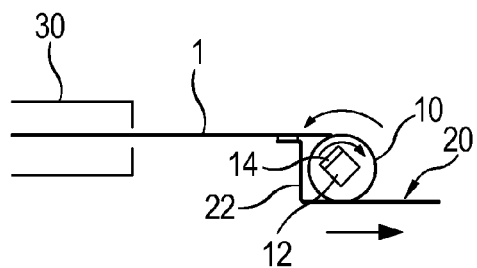

In the phase shown in FIG. 7c, this process has already advanced so far that the lateral area 22 of the removal unit 20 is supported by the roller 10 and the removal unit 20 can no longer be transported further in this direction. Now, in this situation, the support 12 located inside of the roller 10 is brought into a rotational position in which the magnets 14 located thereon are oriented towards an upper area of the roller 10 that is nearest to the leading edge of the storage phosphor plate 1. This is illustrated in the right part of FIG. 7c. This leads to a substantial reduction of the frictional forces between the roller 10 and the removal unit 20, whereas the magnetic attraction forces in the upper part of the roller 10 increase significantly so that, when the rotational direction of the roller 10 is reversed again, a magnetic coupling now occurs between the storage phosphor plate 1 and the roller 10 and the storage phosphor plate 1 is transported further out of the cassette 30.

Figure 7D:
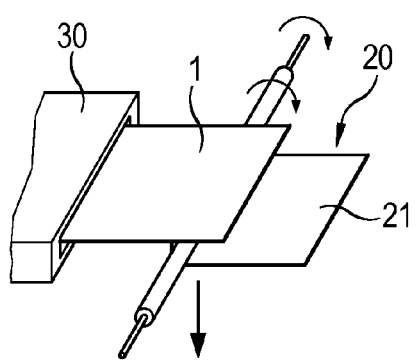
Figure 7D:
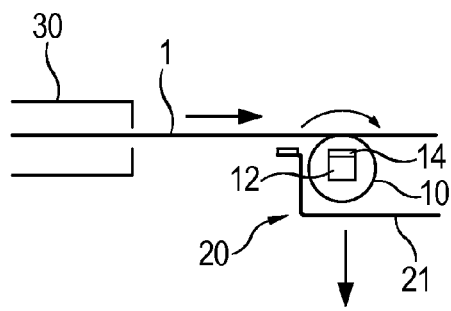

FIG. 7d shows a phase in which the support 12 located inside the roller 10 is oriented in such a way that the magnetic field generated by the magnets 14 located on the support 12 is at its largest right in the contact area between the storage phosphor plate 1 being transported and the roller 10. The frictional forces between the roller 10 and the storage phosphor plate 1 are correspondingly high so that a reliable transport of the storage phosphor plate 1 out of the cassette 30 is ensured.

As a result of the rotational position of the support 12, including the magnets 14 located thereon, the base plate 21 of the removal device 20 is no longer attracted by the roller 10 so that the removal device 20 which is mounted with a vertical tolerance falls a bit downwards (see vertical arrow in FIG. 7d). The rotating roller 10 now only transports the storage phosphor plate 1, preferably past the line 8 (see FIG. 1) in the area of the read-out device, whereas the removal device 20 maintains its position and is available for a subsequent return transport of the storage phosphor plate 1 into cassette 30.

During the return transport, the above-described steps are executed in the reverse order until the read out storage phosphor plate 1 has been returned into the cassette 30.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A device for reading out X-ray information stored in a storage phosphor plate, the device comprising:
a read-out device configured to irradiate the storage phosphor plate with stimulating light and to detect emission light which is stimulated in the storage phosphor plate; and
a transport device configured to transport the storage phosphor plate, the transport device including at least one roller configured to rotate about a rotational axis of the at least one roller; wherein
the at least one roller includes a hollow body and at least one magnet arranged inside of the hollow body;
the device further includes a support located inside of the at least one roller and extending in a direction of the rotational axis of the at least one roller;
the support is rotatably mounted about a longitudinal axis which extends substantially parallel to the rotational axis of the at least one roller, or which coincides with the rotational axis of the at least one roller; and
the support is rotatable such that a rotational position of the support allows a first area on an outside circumference of the at least one roller, which has a magnetic field larger than a magnetic field in other areas on the outside circumference of the at least one roller, to attract a ferromagnetic body to the at least one roller when the ferromagnetic body contacts the first area on the outside circumference of the at least one roller.

2. The device according to claim 1, wherein the support or at least a section of the support is ferromagnetic.

3. The device according to claim 1, wherein the at least one magnet is located on a side area of the support which extends parallel or substantially parallel to the rotational axis of the at least one roller.

4. The device according to claim 1, wherein the at least one roller is made of a non-ferromagnetic material.

5. The device according to claim 1, wherein an outer circumferential area of the at least one roller includes a friction-enhancing coating.

6. The device according to claim 1, wherein the transport device includes a removal unit configured to be coupled to the storage phosphor plate, the removal unit including a ferromagnetic area so that the removal unit, optionally together with the storage phosphor plate coupled thereto, is transported by rotation of the at least one roller when the removal unit comes into contact with the ferromagnetic area.

7. The device according to claim 6, wherein the removal unit is configured to remove and/or return the storage phosphor plate, respectively, from and into an initial position.

8. The device according to claim 1, wherein the transport device is configured to transport the storage phosphor plate relative to the read-out device.

9. A system for reading out X-ray information stored in a storage phosphor plate, the system comprising:
a storage phosphor plate including a base layer and a storage phosphor layer on the base layer;
a device according to claim 1; and
at least a partial area of the base layer of the storage phosphor plate is ferromagnetic.

10. A device for reading out X-ray information stored in a storage phosphor plate, the device comprising:
a read-out device configured to irradiate the storage phosphor plate with stimulating light and to detect emission light which is stimulated in the storage phosphor plate; and
a transport device configured to transport the storage phosphor plate, the transport device including at least one roller configured to rotate about a rotational axis of the at least one roller; wherein
the at least one roller includes a hollow body and at least one magnet arranged inside of the hollow body;
the device further includes a support located inside of the at least one roller and extending in a direction of the rotational axis of the at least one roller; and
the support is bar-shaped and has a rectangular or square cross-section.

11. The device according to claim 10, wherein the support or at least a section of the support is ferromagnetic.

12. The device according to claim 10, wherein the at least one magnet is located on a side area of the support which extends parallel or substantially parallel to the rotational axis of the at least one roller.

13. The device according to claim 10, wherein the at least one roller is made of a non-ferromagnetic material.

14. The device according to claim 10, wherein an outer circumferential area of the at least one roller includes a friction-enhancing coating.

15. The device according to claim 10, wherein the transport device includes a removal unit configured to be coupled to the storage phosphor plate, the removal unit including a ferromagnetic area so that the removal unit, optionally together with the storage phosphor plate coupled thereto, is transported by rotation of the at least one roller when the removal unit comes into contact with the ferromagnetic area.

16. The device according to claim 15, wherein the removal unit is configured to remove and/or return the storage phosphor plate, respectively, from and into an initial position.

17. The device according to claim 10, wherein the transport device is configured to transport the storage phosphor plate relative to the read-out device.

18. A system for reading out X-ray information stored in a storage phosphor plate, the system comprising:
a storage phosphor plate including a base layer and a storage phosphor layer on the base layer;
a device according to claim 10; and
at least a partial area of the base layer of the storage phosphor plate is ferromagnetic.

19. A storage phosphor plate comprising:
a base layer; and
a storage phosphor layer on the base layer; wherein
the base layer includes a ferromagnetic layer and two non-ferromagnetic layers, the ferromagnetic layer being located between the two non-ferromagnetic layers.

20. The storage phosphor plate according to claim 19, further comprising at least one additional ferromagnetic area provided on the ferromagnetic layer.

* * * * *